UNITED STATES PATENT OFFICE 2,567,671

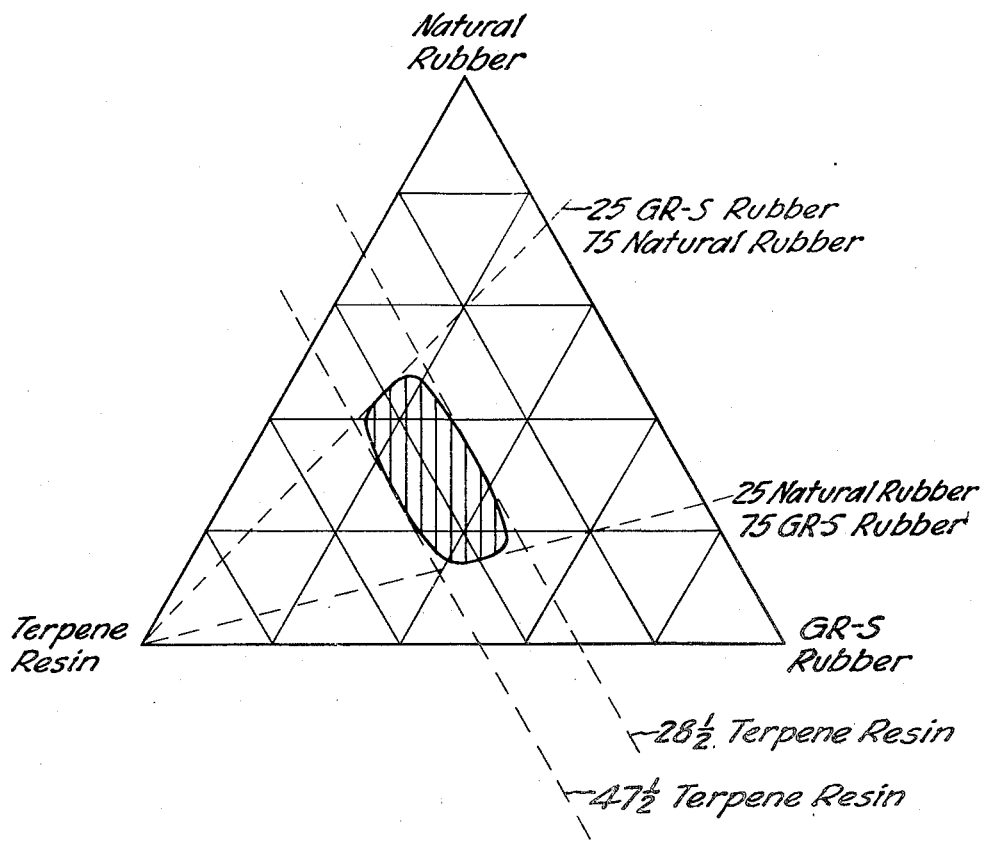

PRESSURE-SENSITIVE ADHESIVE TAPE

Edwin O. Joesting, St. Paul, Minn., assignor to Minnesota Mining and Manufacturing Company, St. Paul, Minn., a corporation of Delaware Application October 10, 1949, Serial No. 120,491

2 Claims. (Cl. 117—122)

This invention relates to normally tacky and pressure-sensitive adhesive tapes, and particularly to transparent tapes having age-resistant transparent adhesives.

Transparent tapes, consisting essentially of transparent normally tacky and pressure-sensitive adhesive coatings firmly bonded to transparent flexible backing members such as cellophane or cellulose acetate films, are widely employed for sealing packages, hanging posters, mending books, and other applications. The adhesive layer desirably consists of natural or synthetic rubber and a resinous tackifier. These raw materials provide generally acceptable adhesive compositions, and are readily available at reasonable cost. Deterioration of such adhesives under exposure to sunlight has long been a problem, the effect of sunlight being to soften and liquify the adhesive.

One test which the tape is required to pass before it can be accepted for certain applications is a sun-lamp exposure test. The test section of tape is rolled into full contact with a sheet of sulphate paper of letterhead grade and is then exposed continuously for 30 hours to standard illumination, directed vertically at the exposed transparent backing, from a General Electric "S-1" sunlamp at a distance of 30 inches and under conditions of 120° F. Under these conditions it has been found that all available transparent adhesives based on natural rubber soften or partially liquify and penetrate through the test paper.

It is an object of the present invention to produce a transparent normally tacky and pressure-sensitive adhesive from a combined natural and synthetic rubber base and having improved properties, particularly with respect to resistance to sunlight. Another object is the production of a normally tacky and pressure-sensitive adhesive tape and particularly a transparent tape which under the test conditions above defined will not result in penetration of the test paper by the adhesive. Other objects will be apparent in view of the following description and the appended claims.

Polymerized terpene resins, particularly polymerized beta-pinene resins, have previously been suggested as tackifiers for natural rubber and for certain synthetic rubbery polymers in the production of normally tacky and pressure-sensitive adhesives. A typical example of such a resin is the pure hydrocarbon thermoplastic terpene resin melting at 85° C., having a zero acid number and known as Piccolite S-85. These resins are light in color, are non-oxidizing and are soluble in such low-cost and readily available solvents as gasoline and heptane. They are thermoplastic and do not set up on continued heating. They are fully compatible with natural rubber and with certain synthetic rubbers such as polyisobutylene. The use of these resins with crude rubber in the production of pressure-sensitive adhesives provides improved properties over similar combinations employing rosin or the like but the adhesives nevertheless fail under the sun-lamp exposure test and tapes coated with these adhesive masses have not been satisfactory for a number of applications.

When GR-S synthetic rubber is substituted for the natural rubber of the above adhesives, the resulting blend is found to be completely non-tacky and cloudy or opaque in appearance.

Surprisingly, I have now discovered that GR-S rubber may be blended with natural rubber to produce a rubbery base with which polymerized terpene resins of zero acid number and having melting points of at least abot 80° C. are fully compatible and in which the resin exhibits fully as great tackifying power as in the absence of the GR-S rubber. The resulting adhesive is found to be highly resistant to degradation by sunlight and effectively meets the sunlight exposure test above described. These novel adhesives permit of making transparent pressure-sensitive adhesive tapes of high quality from all standpoints.

The following example represents a typical formulation of many novel adhesive compositions.

Example:                                          Parts by weight
   Latex crepe natural rubber _____ 50
   Rubbery butadiene-styrene copolymer (e. g., GR-S X-274) _____ 50
   Anti-oxidant (e. g., alkylated polyhydroxy phenol) _____ 1
   Polymerized terpene resin (e. g., "Piccolite S-85") _____ 50
   Heptane _____ 600

The several solid components may be dissolved directly in the solvent but preferably are first blended together by milling on a rubber mill and are then dissolved, e. g. in a paddle-type mixer.

The adhesive composition is coated in a thin uniform layer on the previously primed surface of cellophane and the solvent removed by evaporation to produce a normally tacky and pressure-sensitive transparent adhesive tape. After testing for 30 hours in the sunlight exposure test, such tape produces no discoloration of the back surface of the test paper and is therefore judged satisfactory.

The copolymer of the above formula represented a ratio of 72 parts butadiene and 28 parts styrene. This polymer as produced commercially is known as GR-S X-274 and contains a small proportion, viz. 1.25%, of a mixture of mono and di-hepto diphenyl amines as an anti-oxidant. Other rubbery GR-S type polymers have been employed with substantially equivalent results. For example a copolymer of 50 parts of butadiene and 50 parts of styrene has replaced the above polymer in the formula given.

Likewise other terpene resins may replace the specific resin identified in the formula. In particular polymerized beta-pinene resins of somewhat higher melting points have been found to provide excellent properties. For example Piccolite S-125 melting at 125° C. has given good results and the adhesive is somewhat higher in melting point than the one shown hereinabove.

The formula of the above example represents preferred proportions and preferred component ingredients. It is apparent from the foregoing paragraphs that other equivalent ingredients may be substituted for those there specified. Likewise some substitutions in proportions are found to provide excellent adhesive characteristics and are here contemplated. However too high a proportion of the resinous component, e. g. the Piccolite S-85 is found to produce undesirably high adhesion to the tape backing when the tape is wound in roll form and frequently results in tearing and breaking of the tape during unwinding. Too low a proportion of the tackifier resin results in an undesirably low adhesion value and the tape is unsatisfactory for its intended purpose. With extremely small percentages of the GR-S rubber the adhesive shows no apparent improvement over the two-component system of natural rubber and resin which, as previously noted hereinabove, was ineffective in meeting the sunlight exposure test and the various practical applications on which such test is based. On the other hand, too high a proportion of GR-S rubber has been observed to result in reduced tackiness of the adhesive and in varying degrees of opacity.

The single figure of the drawing represents the proportions of the three major components of the example which have been found to provide adequate adhesion value, transparency, resistance to degradation by sunlight and when in the form of a roll of tape, to provide good unwind characteristics. The shaded area of the drawing represents this useful range which will be observed to lie within the approximate proportions of 25 to 75 parts natural rubber, 25 to 75 parts GR-S synthetic rubber and from about 40 to about 90 parts of polymerized terpene resin based on 100 parts of combined rubbers. Adhesive compositions falling within this area have been found when coated on suitable transparent backings to provide clear, transparent, normally tacky and pressure-sensitive adhesive tapes eminently suitable for applications involving attractive appearance and good adhesive holding power under exposure to sunlight.

Having disclosed various embodiments of my invention for purposes of illustration rather than limitation, what I claim is as follows:

1. Normally tacky and pressure-sensitive adhesive tape comprising a flexible backing and a firmly adherently bonded coating thereon of an adhesive consisting essentially of a blend of about 25-75 parts of natural rubber, correspondingly about 75-25 parts of butadiene-styrene synthetic rubber, and, based on 100 parts of the combined rubbers, about 40-90 parts of a thermoplastic terpene resin of zero acid number and having a melting point of at least about 80° C., the proportions of the above three components being substantially within the range indicated by the shaded area of the drawing.

2. Transparent, normally tacky and pressure-sensitive adhesive tape comprising a transparent film backing and a firmly adherently bonded coating thereon of a transparent adhesive composition consisting essentially of about 50 parts by weight of natural rubber, about 50 parts by weight of butadiene-styrene synthetic rubber and about 40-60 parts of a pure hydrocarbon thermoplastic terpene resin having a zero acid number and having a melting point of at least about 80° C.

EDWIN O. JOESTING.

REFERENCES CITED

The following references are of record in the file of this patent:

UNITED STATES PATENTS

| Number | Name | Date |
| --- | --- | --- |
| 2,411,905 | Stephens | Dec. 3, 1946 |
| 2,458,166 | Homeyer | Jan. 4, 1949 |
| 2,459,891 | Nelson et al. | Jan. 25, 1949 |
| 2,468,482 | Campbell | Apr. 26, 1949 |